US005335180A

United States Patent [19]

Takahashi et al.

[11] Patent Number: 5,335,180

[45] Date of Patent: Aug. 2, 1994

[54] METHOD AND APPARATUS FOR CONTROLLING MOVING BODY AND FACILITIES

[75] Inventors: Kazunori Takahashi, Hitachi; Nobuhiro Hamada, Hitachiota; Masao Takato, Kutsuta; Kenji Baba; Yasuo Morooka, both of Hitachi; Junzo Kawakami, Mito; Takayoshi Yokota, Hitachiota; Ryuji Kiyokawa, Hitachi, all of Japan

[73] Assignee: Hitachi, Ltd., Tokyo, Japan

[21] Appl. No.: 760,962

[22] Filed: Sep. 17, 1991

[30] Foreign Application Priority Data

Sep. 19, 1990 [JP] Japan ................................ 2-247500

[51] Int. Cl.5 ........................................ G01N 15/00

[52] U.S. Cl. ................................ 364/436; 364/555

[58] Field of Search ............... 364/436, 437, 438, 555, 364/551.01, 578; 340/937, 909, 916, 942-943; 395/900, 920, 910, 918; 377/11-16

[56] References Cited

U.S. PATENT DOCUMENTS 2,933,716 4/1960 Soderberg .
3,573,724 4/1971 Komorida ........................ 340/38.31
3,626,413 12/1971 Zachmann ............................ 343/8
3,808,410 4/1974 Schlesinger ........................ 235/156
4,023,017 5/1977 Ceseri ................................. 364/438
4,370,718 1/1983 Chasek ............................... 340/943
4,674,069 6/1987 Mizuno ............................... 340/943
4,709,264 11/1987 Tamura et al. ...................... 358/93
4,847,772 6/1989 Michalopoulos et al. .......... 364/436
4,916,621 4/1990 Bean et al. .......................... 364/436
4,979,118 12/1990 Kheradpir .......................... 364/436
4,994,969 2/1991 Petit ................................... 364/436
5,038,290 8/1991 Minami ............................... 364/436
5,161,107 11/1992 Mayeaux et al. .................. 364/436

FOREIGN PATENT DOCUMENTS 0333459 9/1989 European Pat. Off. .
2826055 12/1979 Fed. Rep. of Germany .
3128578 2/1983 Fed. Rep. of Germany .
2296231 7/1976 France .
2388345 11/1978 France .
2567550 1/1986 France .
2613098 9/1988 France .
2615957 12/1988 France .
2134552 8/1990 Japan .

OTHER PUBLICATIONS

Fuji-Techno System: Supervisory Control System Handbook p. 1550, 1989.
Takaba et al.,"Real Time Measurement of People Flow Through ITV Images", Information and Communication Engineers of Japan, Technical Study Report, Nov. 1980, IE 80-73.

*Primary Examiner*—Thomas G. Black
*Assistant Examiner*—Tan Q. Nguyen
*Attorney, Agent, or Firm*—Antonelli, Terry, Stout & Kraus

[57] ABSTRACT

A control method for a moving body and facilities is comprised of steps of measuring and recognizing at least one of the states such as the number of a moving body, moving speed and moving direction, and changing the state of facilities which is a goal of the moving body based on the result of the measurement/recognition, or displaying the state of the facility. A control apparatus for a moving body and facilities is comprised of a measuring unit for measuring at least one of the states such as the number of a moving body, moving speed, and moving direction, a memory unit for storing information on the condition of a local area in which the moving body is moving or on the facilities said moving body is heading for; an arithmetic unit for processing information from the measurement unit and memory unit; and an input/output unit for accessing information processed by the arithmetic unit, and displaying the information.

27 Claims, 17 Drawing Sheets

EXTRACTED IMAGE FOR MEASURING THE NUMBER OF PEOPLE

EXTRACTED IMAGE FOR MEASURING THE NUMBER OF VEHICLES

FIG. 11B
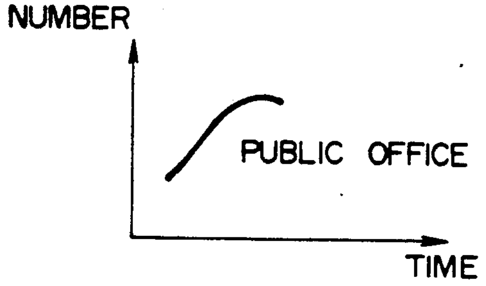
FIG. 11C
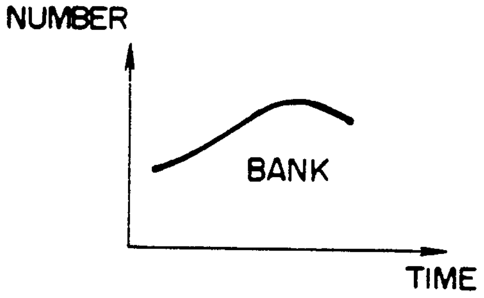
FIG. 11D
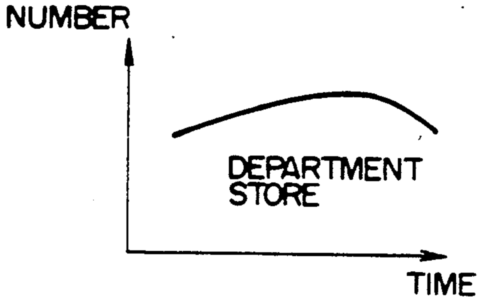
FIG. 11E
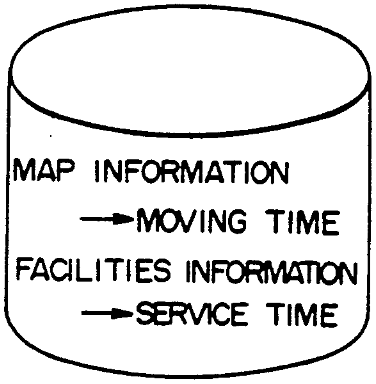
FIG. 11F
OUTPUT FROM SCHEDULE DEVICE
1. PUBLIC OFFICE (TIME)
2. BANK (TIME)
3. DEPARTMENT STORE (TIME)

§ · · · MEASUREMENT NUMBER

· · · OPERATIONAL VARIABLE

METHOD AND APPARATUS FOR CONTROLLING MOVING BODY AND FACILITIES

BACKGROUND OF THE INVENTION

The present invention relates to the network measurement and estimation equipment for people flow, for example, in cities, local areas, play grounds, exhibition halls, buildings/interbuildings and the like, and also it relates to the control equipment for controlling utilities and service facilities in the cities, local areas and the like.

Thereby, the present invention is capable of being applied to a number of support systems to assist a smooth, comfortable and safe city life and activity through the combined use of facilities such as a facilities control system, information service system, action instruction system (compulsory/recommendatory); moving vehicle operation control system, moving body (vehicle) entrance regulation system, event holding support system, environmental media representation system, evacuation guidance system, burglar alarm system, urban restructure planning support system, facilities-building optimized disposition support system, market survery support system, and information on the people flows therein and the like.

According to the prior art, in order to handle the problems in towns and cities related to the mass flow, or more specifically in case of a vehicle flow, transportation control systems, for example, have been put in service. In such case, vehicle sensors, image sensors, automatic vehicle identifier (AVI), ITV and the like are utilized as measuring equipment. In particular, in case of the application of image processing techniques, such items as follows are measured for the traffic signal control (Fuji-Techno System: Supervisory Control System Handbook, p. 1550, 1989).

Measurement intervals: every 1-5 min.

Measurement items: number of vehicles, average speed, occupancy, average length of vehicle body, type of vehicle (large/small), quantities of flow.

Further, in a case where an object of measurement is people flow, there has been employed such a prior art as described in "Real-time measurement of people flow through ITV images" by Takaba et al., the Institute of Electronics, Information and Communication Engineers of Japan, Technical Study Report, IE80-73, November 1980. In this case, an ITV camera, VTR and computer are used as measurement equipment, memory unit and image processor unit, respectively. It is reported that the number of people can be measured relatively precisely in such an area where people are sparsely distributed and moving.

Still further, as an existing system serving as a kind of city information system, there is such a system whereby one can access from one's terminal through a video-tex network an information center where a large quantity of information is stored including the contents of various services, addresses, reservation status and the like.

SUMMARY OF THE INVENTION

The aforementioned prior arts are concerned with the measurements of the number of moving bodies and their speeds mainly at their measuring points (sites), and did not take into consideration such factors as interrelations between respective measuring points (including time delays), and prediction of status changes at each point. Further, information on the weather, data of week, time and the like which exert a great influence on the quantities of moving bodies, has not been taken into account fully but only empirically. Thereby, drivers or pedestrians who look at the information, must estimate what they really need empirically by themselves. Further, according to the above-mentioned city information system, one can obtain only static information on the contents of services at each facility, time zone available for service and the like, which, however, will not assist one to decide whether to start for a certain spot now, if so, by what route, and if there are several spots to visit, in what sequence, because current degrees of congestion, for example, at each service points and en route are unknown.

Accordingly, it is a general object of the present invention to provide an improved control method and apparatus for a moving body and facilities in which the aforementioned shortcomings and disadvantages of the prior art can be eliminated.

Another object of the present invention is to provide dynamic information on not only current but also a predicted status, for example, the degrees of congestion, of the roads and service facilities, through on-line detecting of the flows of vehicles and people, combining detected information with such on the weather and date of the week, thus formulating a model with which to evaluate and predict dynamic status changes precisely.

Another object of the present invention is to determine an optimum sequence or route of itineration and submit it to the moving body. Still another object of the present invention is to provide a system whereby objective facilities for the model formulated as above are capable of being driven and controlled so as to adapt to the model, or the environment for the moving body is capable of being changed through system operation.

Furthermore, another object of the present invention is to provide means for measuring information on moving bodies which serve as important data in determining, for example, widths of roads and sidewalks, or arrangement of facilities and buildings in urban planning.

A still another object of the present invention is to provide a system whereby the flow of moving bodies which serves as important data when instructing optimum evacuation routes at the time of emergency is capable of being measured on-line so as to execute optimum evacuation guidance.

According to an aspect of the present invention, a control method for a moving body and facilities is comprised of steps of measuring and recognizing at least one of the states such as the number of a moving body, moving speed and moving direction, and changing the state of facilities which is a goal of the moving body based on the result of the measurement/recognition, or displaying the state of the facility.

According to another aspect of the present invention, a control apparatus for a moving body and facilities is comprised of a measuring unit for measuring at least one of the states such as the number of a moving body, moving speed, and moving direction, a memory unit for storing information on the condition of a local area in which the moving body is moving or on the facilities said moving body is heading for; an arithmetic unit for processing information from the measurement unit and memory unit; and an input/output unit for accessing information processed by the arithmetic unit, and displaying the information.

In a preferred embodiment of the invention, a plurality of measuring equipment are installed at respective measuring points. One or more arithmetic unit(s) for receiving information from the plurality of measuring equipment and forming a model thereof, and memory means for storing such information are also installed. Further, a plurality of input/output equipment are installed for displaying such measured information or accessing the measured information. Around the arithmetic unit, the measuring equipment, memory equipment, and input/output equipment are connected together in combination to constitute a system. A display unit or memory unit may be directly connected to the measuring equipment. The arithmetic unit is composed of mechanisms such as for generating respective models for each measuring equipment, modeling influence propagation correlations between the measuring equipment, analyzing various influential factors affecting the quantities of movement, and parameterizing the same. In the memory means, there are stored not only information transmitted from the arithmetic unit, but also information on the maps of local areas and the facilities therein.

Further, for determining and indicating a preferred sequence of movement to facilities, or its route, there are provided scheduling equipment and driving equipment each connected to the arithmetic unit, the former for rescheduling itineration, the latter for directly driving actuators of movable facilities. The scheduling equipment comprises a supervisory mechanism for monitoring the models, a request reception mechanism for accepting a scheduling request list, and an allocation mechanism for allocating requested facilities and its time in an optimized sequence. Further, the facilities driving equipment contains a conversion mechanism for converting the quantities of the moving body into operating variables.

Firstly, a plurality of measuring equipment are installed at every preferred sites in an objective area, for instance, at the entrance and exit of roads, sidewalks and facilities. The measuring equipment monitors moving bodies through an ITV camera or the like, processes their images at a given time intervals, and obtains information regarding the number of moving bodies and their speeds. The information thus obtained is sent to the arithmetic unit for processing any time on request or continuously, or it may be directly transmitted to the display unit or memory unit without passing through the arithmetic unit to be displayed or stored.

On the other hand, the arithmetic unit, upon reception of the information transmitted from the plurality of measuring equipment, while storing the information in the memory unit, generates each model for respective equipment through a model generation mechanism for each equipment and an influence propagation model generation mechanism. Here, the model is that which averages the number of moving bodies with the date of the week, time, typical weather, temperatures and the like. At the same time, various factors influencing the number of moving bodies are analyzed by a factor analysis parameterization mechanism to be expressed by a parameter such as an influence coefficient or the like. By these means, a more precise prediction is capable of being obtained, in particular, when such models are used as prediction models.

The above on-line information which will be stored in the memory equipment may also serve an off-line service providing important data for the urban planning or market surveys. Further, input/output terminals are connected to the arithmetic unit for outputting such on-line information or already stored information on specific display screens or to general purpose output equipment, or for accessing such information. Still further, through a network linkage, a user in a remote location is capable of accessing such information.

Through utilization of the above information obtained according to the present invention, it is possible to provide scheduling equipment whereby an optimized scheduling is capable of being prepared economically. In the scheduling equipment, it is possible to estimate, from the moving body prediction model generated in the arithmetic unit, a status of or situation the moving body will be in at a discretionary time (for instance, whether the traffic is congested or sparse, how long to wait?). Thereby, by entering a facilities utilization request list from a user into this equipment, it is possible to search for an optimum itineration schedule covering every facilities in request in the shortest time. In this case, information such as map information and facilities information is entered into the above memory equipment in advance, because the former is needed in calculating travel time, and the latter for specifying constraints on the services and time zone available. Further, through an interactive modification mechanism whereby the shortest time schedule initially submitted is modified further to accommodate user's subsequent or altered request, a final schedule is achieved.

Further, through utilizing the above information, movable/adjustable facilities are capable of being driven as desired. Upon reception of information regarding the models from the arithmetic unit, the conversion mechanism in the driving equipment converts the information to driving operational variables as required. In accordance with the operational variables, the actuators start their operation. A discretionary portion within an objective control area is capable of being driven by altering the conversion mechanism.

BRIEF DESCRIPTION OF THE DRAWINGS

FIGS. 11A to 11F are explanatory diagrams illustrating how a schedule is prepared;

DESCRIPTION OF THE PREFERRED EMBODIMENTS

Figure 1:
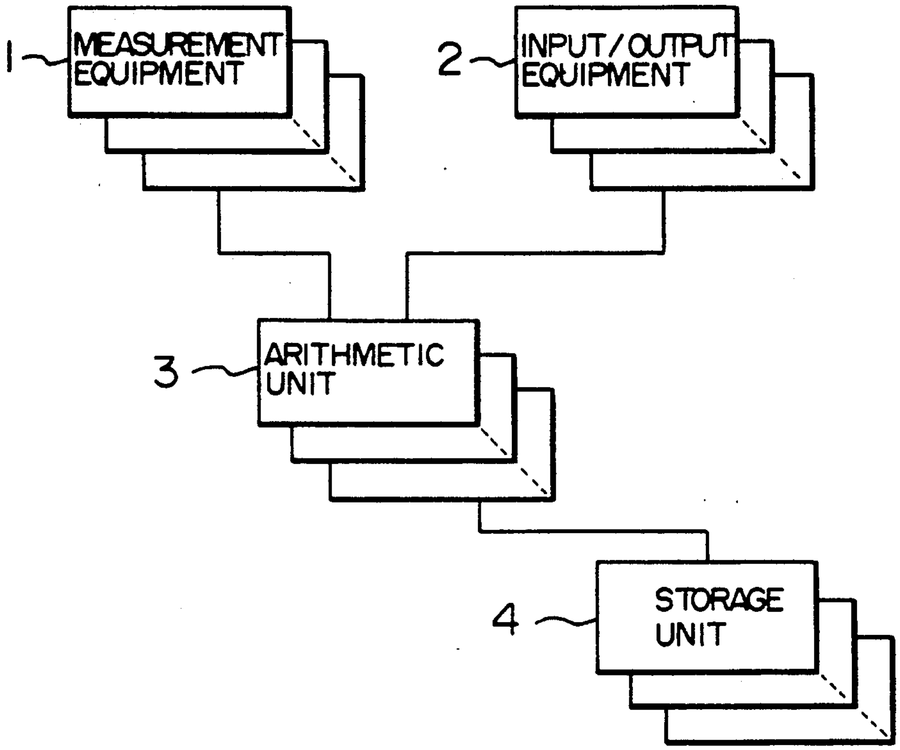
FIG. 1 is a schematic diagram showing an embodiment of the system according to the present invention.

Referring to FIG. 1, an embodiment of the present invention will be described in the following. A system comprises at least one or more measuring equipment 1, at least one or more input/output equipment 2, at least one or more arithmetic unit 3, and at least one or more memory unit 4, each connected to the arithmetic unit.

Figure 2:
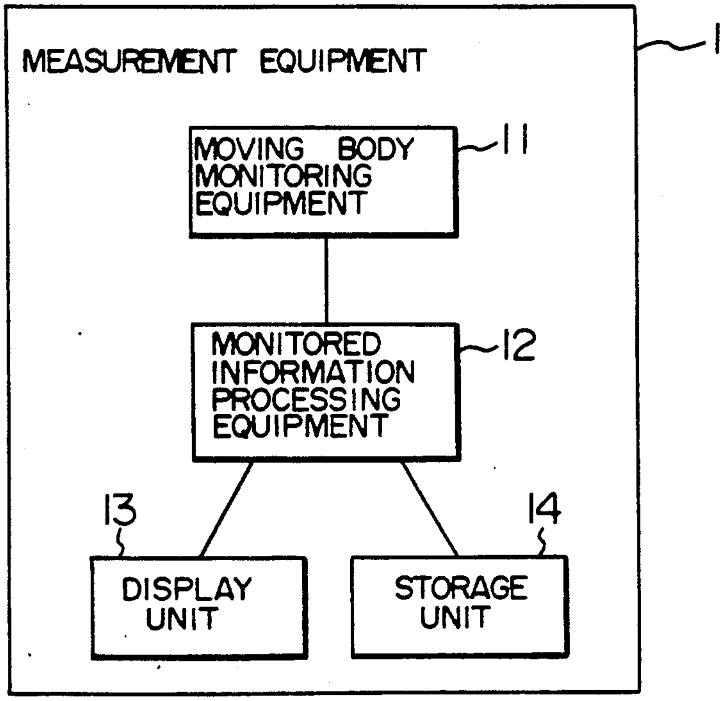
FIG. 2 is a schematic diagram of measuring equipment constituting the system.

Firstly, the measuring equipment 1 will be explained regarding its structure with reference to FIG. 2. The measuring equipment 1 is composed of a moving body monitoring or surveying unit 11 such as an ITV camera, a monitored information arithmetic unit 12 for processing monitored information such as image data transmitted from the monitoring equipment, display equipment 13 for displaying information processed in the arithmetic unit, and memory unit 14 for storing processed information therein.

The measuring equipment 1 will be explained more in detail referring to FIG. 3. The moving body monitoring equipment 11 constantly monitors moving bodies by means of ITV cameras or the like, and transmits the monitored information to the monitored information processing unit 12. Then, the arithmetic unit cuts out a piece of information from what is being sent in constantly at a given time interval Δt for subsequent data processing. In a case where information is analog, it is converted into digital information in this step. Then, by taking the differences in images at every Δt intervals, background components are eliminated so as to retain only information directly related to the moving bodies. Then, the number of moving bodies is counted by a scanning digital image information method. Starting from zero, the counter proceeds with counting by scanning image data from the top to downward in a horizontal direction. If the counter is zero when information other than zero is detected, the counter goes to 1 incremented by one. Then, a point where information other than zero is detected, and a next point on the same sweep line immediately before still another point where information becomes zero again (i.e., both ends of a sweep line where information other than zero exists), are stored in the memory. Then, the scan is continued in the horizontal direction, and when a point where information other than zero is detected again, the counter is incremented by 1 likewise, and both ends of the line where information other than zero exists are stored in addition to the previous information. When the horizontal line scanning is continued to its end without detecting information other than zero, the next line scan starts from its left end. If the counter is detected to indicate other than zero, both ends of a line where information other than zero exists are compared with the information specified by another set of ends previously stored. At this time, when there exists, in the previously stored pairs of end points, a pair of end points the region of which overlaps with that of a newly detected pair of end points, the counter will not be operated. Upon reaching the end of the same horizontal sweep line, the previously stored information is eliminated, and the newly detected information is entered into the memory. If there exists two or more pairs of such overlapping end points, the corresponding number of them are eliminated and the likewise memory operation is performed. If there is none that overlaps, the counter is incremented by one, followed by the likewise memory operation. Such scanning operation is continued until the last line where counting of the number of moving bodies is completed.

During the arithemtic operation, the center of each moving body is obtained for subsequent calculations of moving speeds and directions. The center of the body is obtained as a center of a rectangular area having an initial detection scanning line as its upper line, an end detection scanning line as its bottom line, a leftmost detection end point as its left line, and a rightmost end point as its righthand line.

From the information describing the difference in two images which were obtained with a time interval of Δt by the above arithmetic operations, the number of moving bodies and their respective centers (i.e., differential images) are capable of being obtained. Hence, by comparing information regarding the center of a moving body in a consecutive pair of images, a motion vector for the moving body is capable of being calculated, providing a speed and direction likewise.

When such measuring equipment is installed at an entrance of facilities, the flow of moving bodies is capable of being counted in principle for every inflow and outflow. Thereby, it becomes possible to provide quantitative information on the state of utilization of utilities by displaying on the display screen 13 current degrees of congestion, the number of users in specific facilities in combination with information on the capacities or availabilities of facilities, or by storing such information in the storage unit 14.

It is also possible to measure, by installing a camera having a downward view from an overhead perspective, how many people are there in the premises of a station or in a hall in front of elevators where the motion of people is rather slow.

Figure 3:
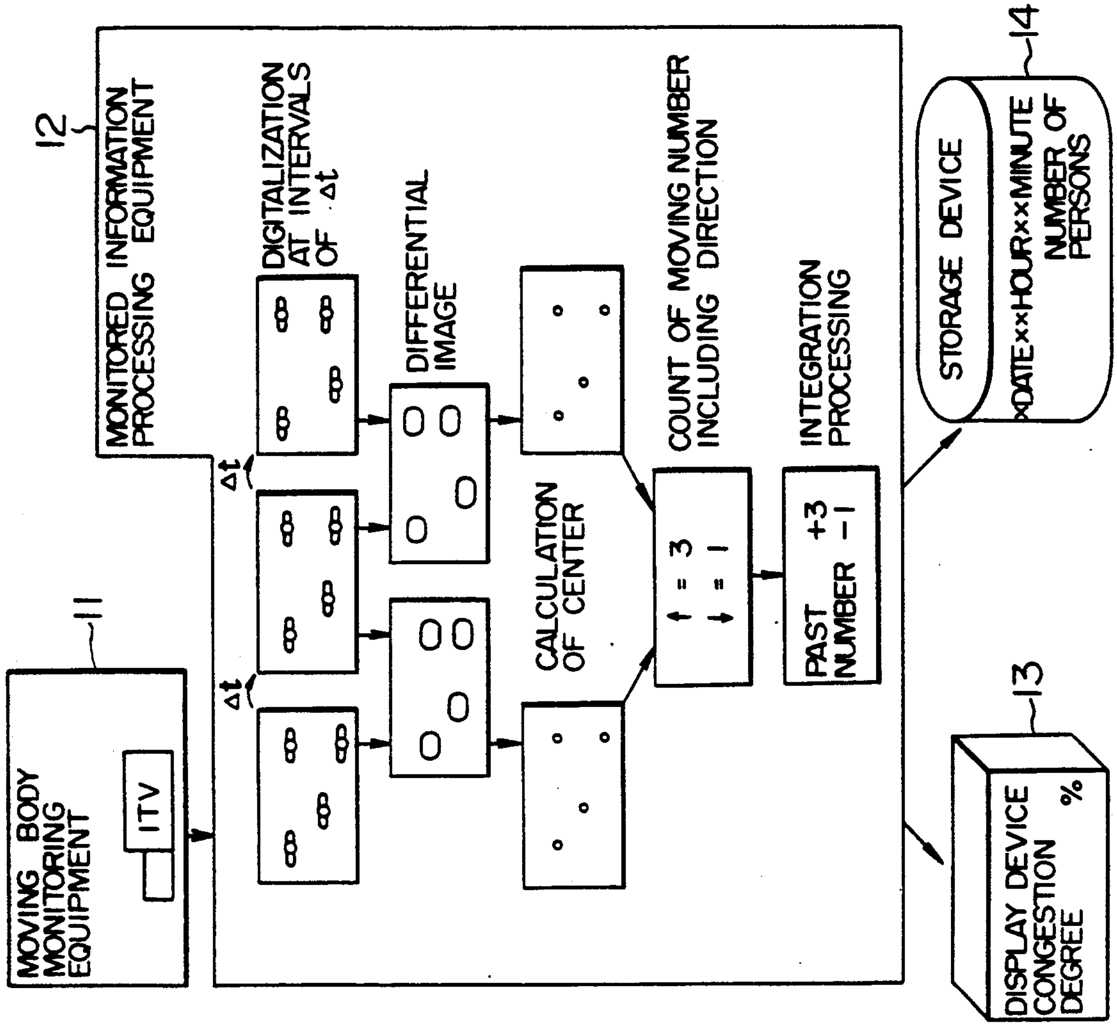
FIG. 3 shows an outline of processing in a monitored information processing unit which constitutes the system.
Figure 4A:
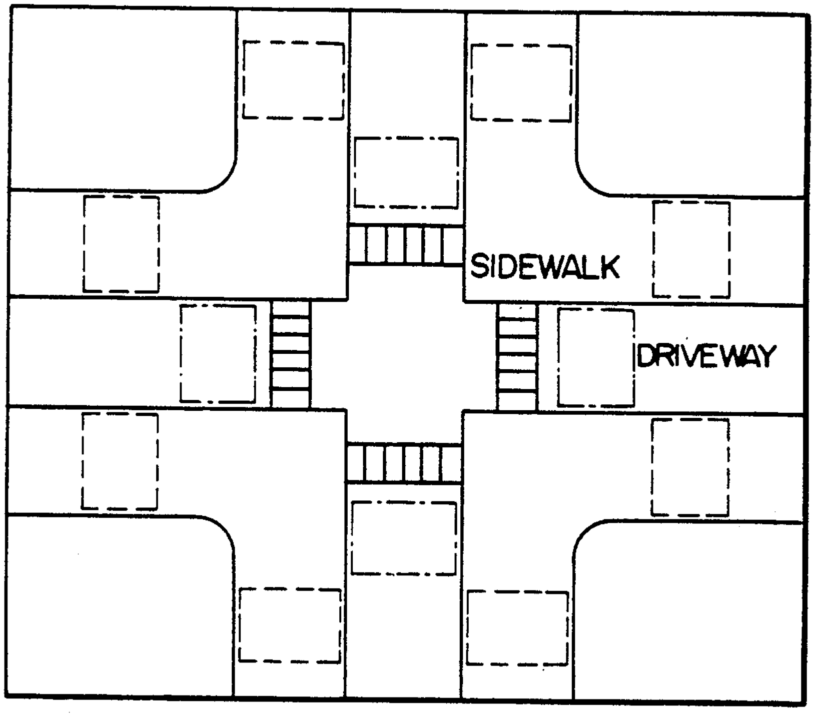
FIG. 4 shows the range of measurement and processing in a crossroad and nearby area to be measured.
Figure 4B:
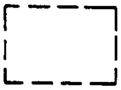
Figure 4B:
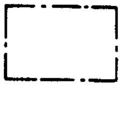

Also, in case of a crossroad as shown in FIG. 4 (*a*) where people and vehicles show very complicated modes of movement, which are monitored by one ITV camera, prior to processing images from the moving body monitoring unit 11 in the monitored information processing unit 12 as in FIG. 3, image extraction processing is executed to extract key images from predetermined partial regions as shown by FIG. 4 (*b*) in FIG. 4 (*a*). Then, the monitored information processing unit 12 performs image processing for every extracted partial image. If a processing speed in the processing unit tends to be so delayed as not be able to match the timing of transmission of monitored information, a plurality of processing units may be installed to cope with the problem.

Hereinabove, where a relatively wide range and a relatively narrow range of monitoring are performed, two different cameras may be employed for specific purposes. However, one camera will serve both purposes, if it is provided with a zooming feature. In such case, from an overhead view, microscopic information such as the number of moving bodies, speed, direction and the like are detected, while from zooming in the partial regions, microscopic information regarding attributes of individual bodies (in case of people, for instance; distinctions of sex, adult or child, stray child or dubious person, et al.) are detected.

In the hereinabove embodiment, an example of measurement by using an ITV camera has been described. Such measurement, however, may be realized by means of a reception type sensor such as an infrared camera, sound sensor, weight sensor, odor sensor and the like. Further, the measurement is also possible by using a transmission type sensor such as an infrared sensor, ultrasonics, radar and the like.

In case of an infrared sensor, the measurement is possible through detection of heat emitted from a moving body and its image processing.

In an application of a sound sensor, a measurement of the number of individual bodies or a rough estimation of the mass quantities is capable of being performed through measuring sound generated by moving bodies, performing frequency analysis to separate individual bodies. It is also possible to calculate a rough estimation of the total number of moving bodies from an empirical correlation between the loudness of sound and the number of moving bodies. Further it is also possible to determine moving directions and speeds through installing a plurality of sensors and performing frequency analysis.

In a case of weight sensors, they are installed in the cage of an elevator or within a train to measure the weight inside for estimating the number of passengers. This can be applied not only to escalators, auto lanes, and vehicles in general, but also to the floors in buildings, general roadways and sidewalks, embedded thereunder to measure information regarding the flow of people and vehicles.

With an odor sensor, smells of tobacco, cosmetics, body, foul mouth or carbon dioxides emitted by people and the like are measured in case of the measurement of people, and in case of vehicles, concentrations of nitrogen oxides and carbon oxides are analyzed to detect their compositions. From a correlation between the detection amounts and actual data stored, the measurement of moving bodies is possible to be made.

An infrared sensor detects an existence of a moving body when it crosses a linear infrared beam emitted from the sensor. An array of such sensors disposed perpendicular to a moving direction or to a height direction are capable of detecting the speed and direction, or a height of a moving body because of a time difference and sequence of crossing, or a height between infrared beams crossed. Similar detection is possible through the use of a ultrasonic sensor. Also it is possible through the use of a radar to detect moving bodies.

The precision of measurement falls when using an ITV camera and there is not sufficient light. However, through an on-line measurement of ambient light with an illuminance meter, by switching over to an infrared camera below a predetermined illumination limit, it is possible to ensure precise measurements.

On the other hand, when the moving bodies are each provided with a transmitter, by means of signal receiving equipment for receiving information from the transmitter installed in place of the above-mentioned measurement equipment, the number, speeds, and directions of the moving bodies nearby the transmitter are capable of being measured likewise. It is further possible to trace the moving bodies in a wider scope of range by means of receiver equipment installed at a plurality of sites. Further, the flow of moving bodies is capable of being estimated more in detail by providing information to be transmitted with such attributes as, for instance, in case of people; sex, age, name, address, phone number, occupation, hobby, any other information requested, and the like; and in case of vehicles, plate number, type of car, owner, address, attributes of payload or passengers, destination, any other information requested and the like. If all the moving bodies are provided with a transmitter, the most precise information will be obtained. It is, however, possible to estimate a total flow from sample measurements of a specific number of moving bodies equipped with the transmitter.

Figure 5:
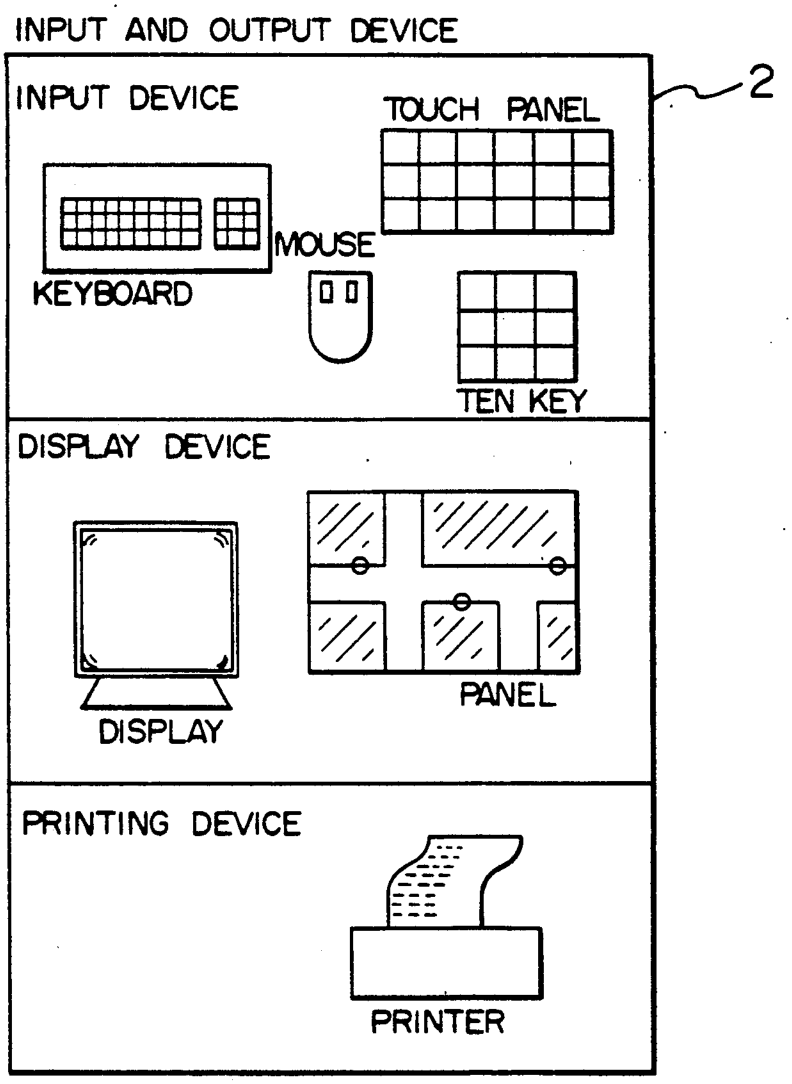
FIG. 5 illustrates some examples of input/output equipment constituting the system.

The detail of the input/output equipment 2 of FIG. 1 is shown in FIG. 5. The input/output equipment 2 is a terminal for accessing information stored in the system and operating various equipment connected to the system, and the same is provided in a plurality of sets in arbitrary combination of: input equipment such as a keyboard, mouse, touch panel, ten-key and the like; output display equipment such as a general purpose display unit, specific purpose panel and the like; and printer equipment such as a printer or the like. In particular, on the specific purpose panel for displaying a map of an objective area, where sites of measuring equipment installed are indicated by LEDs, not only information measured at the site by the measuring equipment is displayed by means of display elements such as LEDs or liquid crystals, but also actual images or pictures being monitored through an ITV camera, if employed, are capable of being displayed simultaneously. If there are too many sites of measurement, there arises a problem that all of them cannot be displayed concurrently. Therefore, by providing a pointing device with which to indicate a desired area to be selectively displayed on the panel, such problem can be solved. Several combinations are capable for the input/output equipment depending on their communication path, including a stationary type wired connection to a movable type wireless connection.

Figure 6:
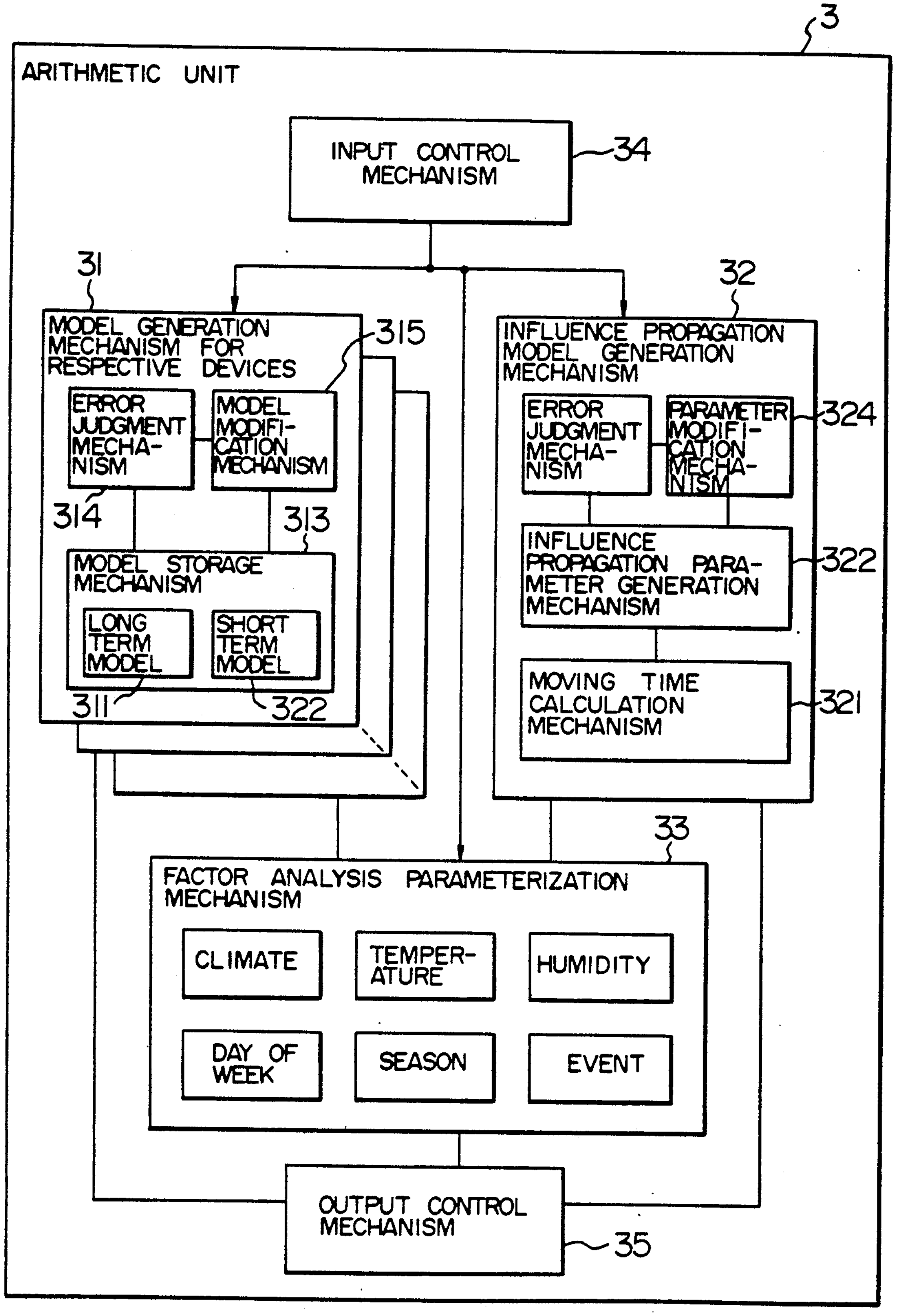
FIG. 6 illustrates an outline of a process of modeling in an arithmetic unit constituting the system.

The detail of the arithmetic unit 3 of FIG. 1 is shown in FIG. 6. The arithmetic unit 3 is mainly provided with one or more of model generation mechanism 31 for generating models for every measuring equipment, an influence propagation model generation mechanism 32, a factor analysis parameterization mechanism 33, an input control mechanism 34, and an output control mechanism 35.

The input control unit 34 has a function to distribute information sent in from the measuring equipment 1 to the three mechanisms 31, 32 and 33 as referred above, and to accept a request for information from the peripheral equipment. The output control mechanism 35 has a function to transmit information in sequence from the arithmetic unit.

The model generation mechanism 31 for generating models for each measuring equipment is a mechanism which generates patterns regarding the number, speeds and directions of moving bodies at each spot of measurement with respect to, for example, the date of the week and time, which patterns will serve as a prediction model for predicting a future status. Two types of models are conceived; one is a long-term model 311 obtained by taking an average of a plurality of similar patterns representing a normalized status; the other is a short-term model 312 obtained by modifying the long-term model 311 to conform to the particular conditions of the day. Information on these two types of models is retained in a model storage mechanism 313 to be supplied on request. Since a moving body changes its conditions with an elapsed time and day, in order to accommodate such changes and update information, for the model there is provided with an error judgment mechanism 314 for judging a deviation in the model from an actual measurement, and with a model modification mechanism 315 for modifying the model in accordance with the result of judgment.

The influence propagation model generation mechanism 32 is such that it digitizes respective degrees of influence with parameters among a plurality of measurement sites so as to generate a network model. Namely, it is such a mechanism whereby information obtained at a certain measurement point is analyzed and digitized regarding what influence and in what degree it may exert on information to be obtained at another measurement point after a given time delay. A time delay is calculated in a travel time calculation mechanism 312 using map information stored in a memory unit to be described later. Since an extent permitted for a moving body to move on the map is limited, a travel distance within the limited movable extent is calculated in the travel time calculator mechanism 312. Since the moving body will change its state with the time and day, in order to accommodate such changes, for the model there is provided with an error judgment mechanism 323 for judging errors between the current parameters indicative of the model and actual measurements, likewise in the model generation mechanism 31 for generating a model for respective measurement equipment, and with a parameter modification mechanism 324 for updating the parameters to conform to be result of judgment.

The factor analysis parameterization mechanism 33 is such a mechanism whereby various factors which influence the number of moving bodies and their speeds, such as weather, temperature, humidity, the day of the week, season, special events or the like, are analyzed and parameterized regarding respective degrees of influences. For instance, with respect to the influence of weather, a parameter descriptive of the influence of a rain in such a statement as what percent reduction in the number from what is expected on a sunny day will accrue, will be extracted from stored information on sunny days and rainy days. Through such means, a more precise prediction taking into account such factors as above is capable of being provided.

Figure 7A:
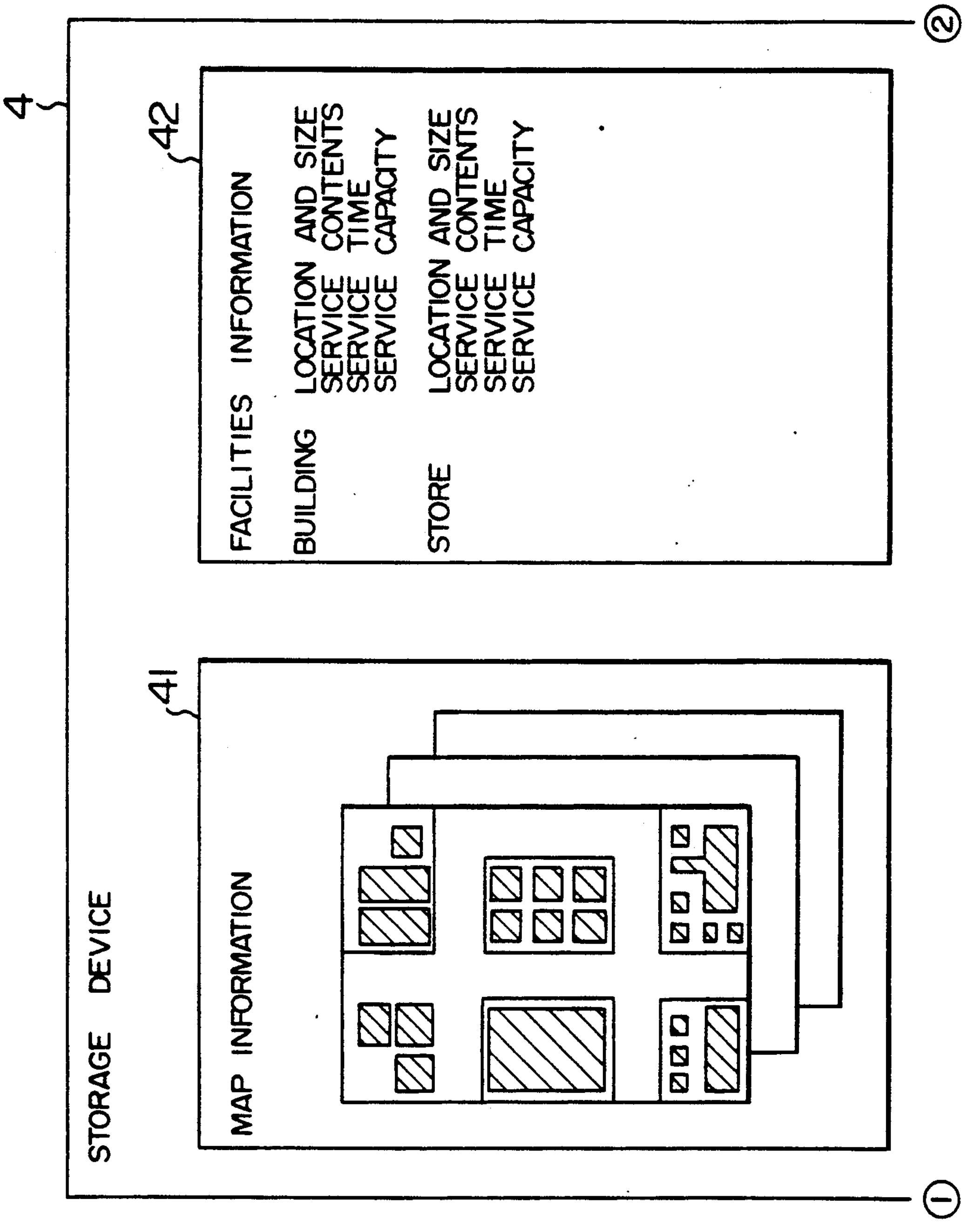
FIG. 7 shows some examples of stored information in a memory unit constituting the system.
Figure 7B:
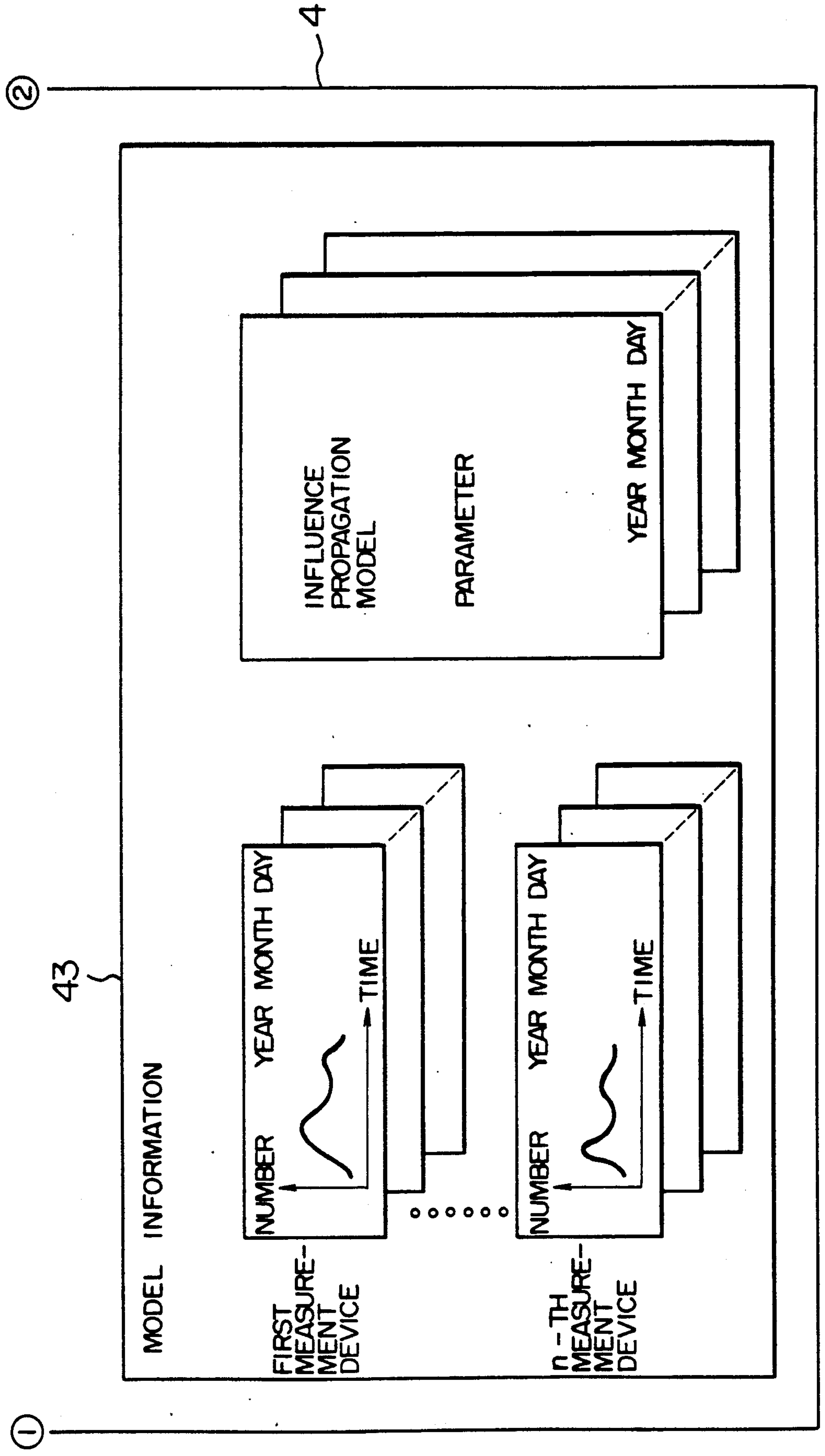

The details of the storage unit 4 of FIG. 1 will be explained with reference to FIG. 7. The storage unit 4 stores mainly three kinds of information. One is objective local area map information 41 including actual sizes and two-dimensional layout of facilities. The second is information on the facilities in the objective local area 42, including locations of facilities, size, the contents of services, open time and capacity. Such available service information is not only catalog-listed, but is categorized into some useful categories, which information, in combination with other related information networks prepared, serves in converting abstract scheduling requests into a conrete schedule in the scheduling unit 5, and also in proposing an alternate plan for a request which cannot be realized because of holiday of the facilities or full-capacity. The third is memory for model information 43 generated in the above-mentioned arithmetic unit 3 which provides a model for each measurement equipment, and an influence propagation model. Not only current information but also the past information is stored therein.

Figure 8A:
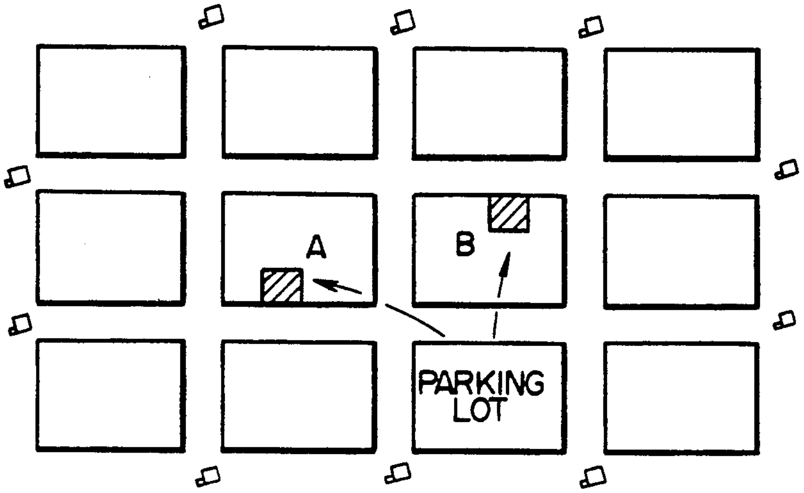
FIGS. 8A to 8C are explanatory diagrams illustrating an embodiment of the invention as applied to a parking lot.
Figure 8B:
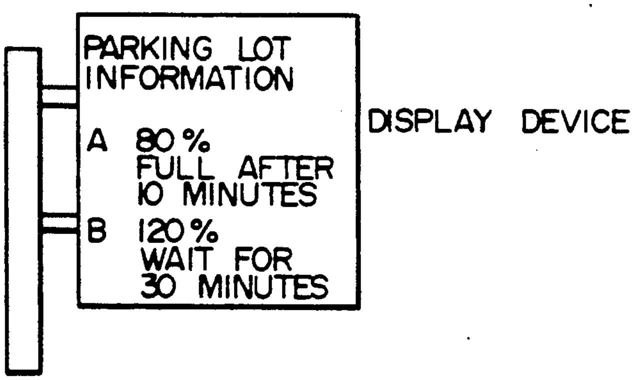
Figure 8C:
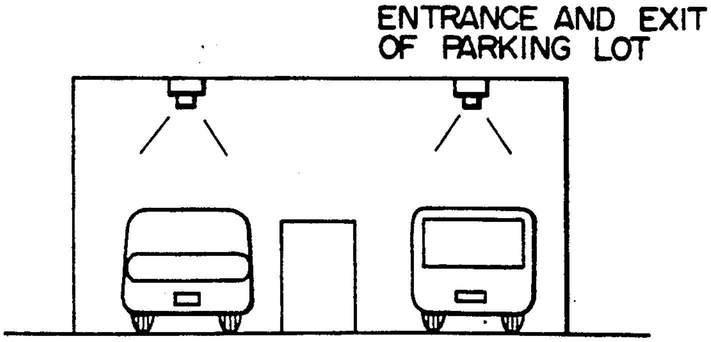

Examples of the present invention as applied to vehicles in transit on the road and to parking lots will be described with reference to FIGS. 8A to 8C. First, a plurality of measurement equipment are installed at every entrance and exit in overhead directions of respective roads and parking lots in an objective area as shown in FIG. 8A. A and B in FIG. 8A indicate parking lots, respectively. Hence, the number of vehicles flowing in and out of the area, and that of the parking lots are capable of being measured. FIG. 8C illustrates a parking lot entrance and a manner of measurement of vehicles. On a display panel installed at the entrance of a road or parking lot, information obtained therein, i.e., as to the current number of vehicles passed, accommodated, status of congestion, whether filled to capacity, degree of vacancy or the like are capable of being displayed without manual intervention. Since it would take a time to get to a parking lot, there arises a problem that one may not be accommodated in the parking lot when one gets there after seeing the current status of vacancy information displayed on a panel installed away from the parking lot. By means of the prediction model according to the present invention which has been generated based on the information regarding the past utilization, it is capable of calculating predictive information such as in what minutes the parking lot will be filled to its capacity, or how long one will have to wait until being accommodated, which, then are displayed to provide for a basis for precise judgment for a next step to be taken.

Another embodiment of the present invention applied to a city planning support system will be described in the following. In the city planning, it is first determined what facilities and buildings in what scale and where are to be constructed. It is preferable to take into account fully the flow of traffic and people before planning so as not to cause local traffic congestion. Thereby, through modeling of the measured flow of moving bodies such as vehicles and people by means of the measurement equipment according to the present invention, it is capable of providing information necessary in deciding changes in the roads and sidewalks, kinds of services to be provided at facilities newly to be built or remodeled.

Still another embodiment of the present invention as applied to an optimum number prediction system for predicting, for example, the required number of lunch to be catered to an event hall, the preparation of which will take a lot of time and labor, will be described below. Lunch catering is time-consuming, earlier preparation will serve cold, untasty food, and a surplus in number involves a disposal of leftovers. Too short in number for fear of waste loses a precious business chance. Thereby, should the precise number in demand be predicted in advance, a hot, tasty lunch just off a grill is capable of being served to match demand, without waste. Hence, by establishing a correlation (for instance, proportional relationship) of moving bodies such as vehicles or people to the number of lunches required, a precise number of lunches to be demanded will be able to be predicted from measured values through a correlation function.

Figure 9:
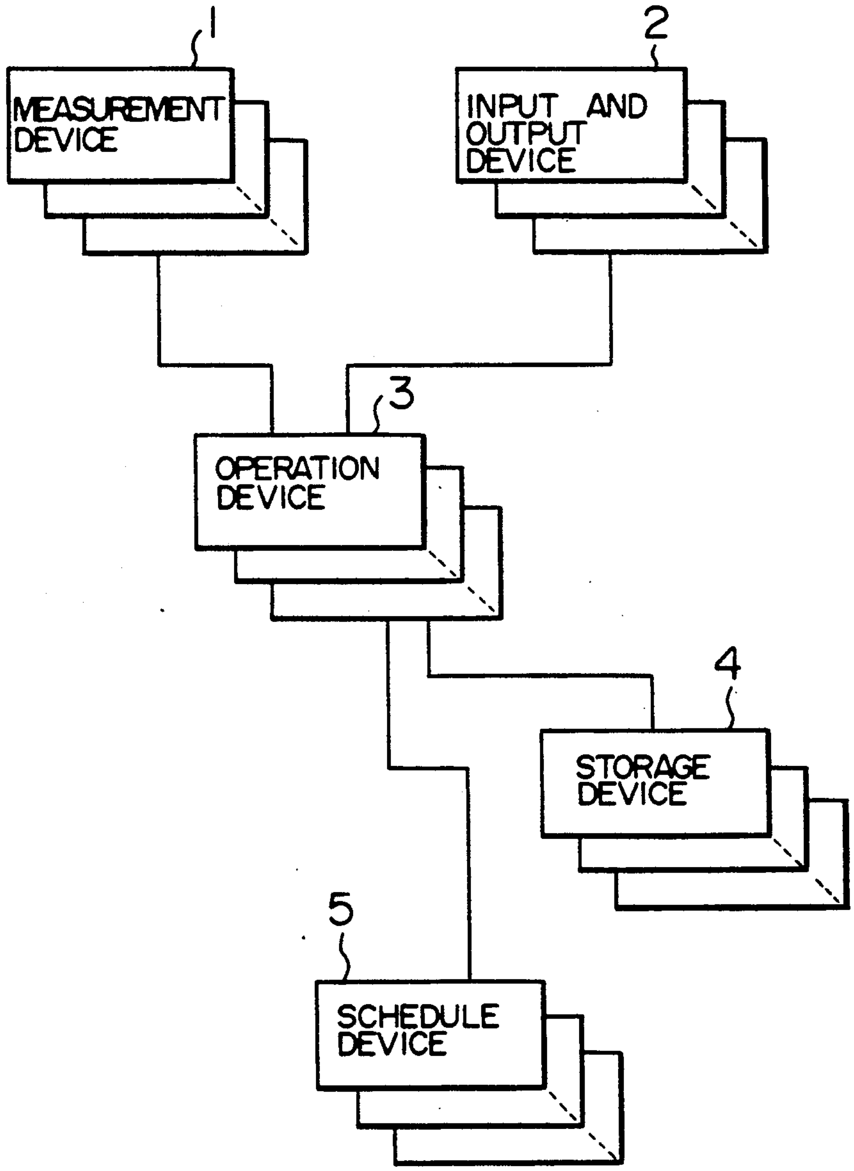
FIG. 9 is a schematic diagram as shown in FIG. 1 wherein a scheduling unit is added.
Figure 10:
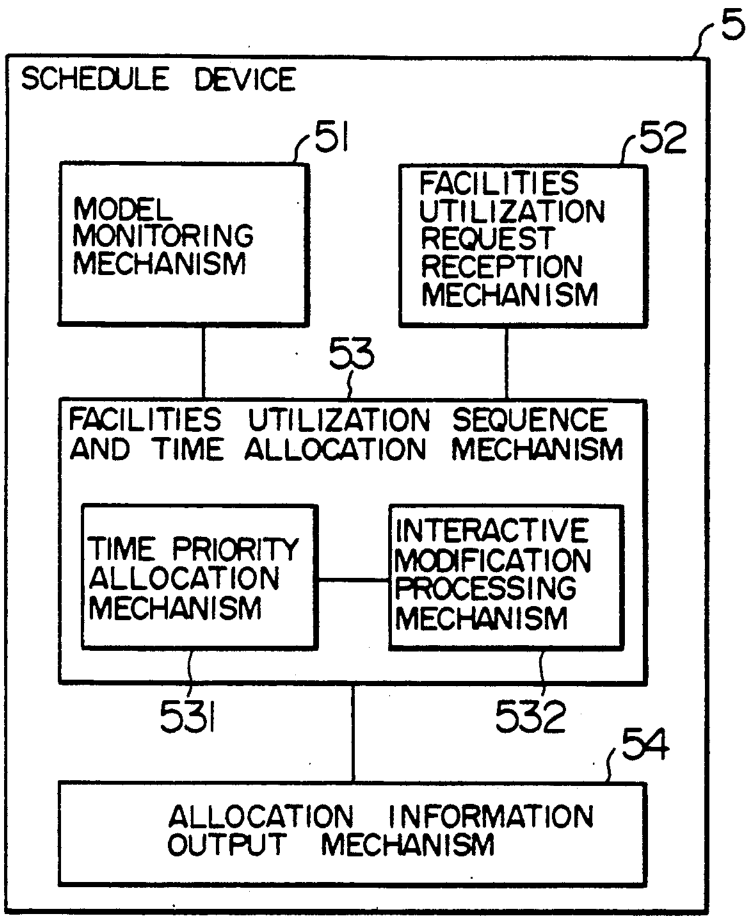
FIG. 10 shows an outline of processing in the above scheduling unit.

FIG. 9 shows an example of a modification of the arithmetic unit 3 in FIG. 1, wherein a scheduling unit 5 is added. Referring to FIG. 10, the detail of the scheduling unit 5 will be described below. The scheduling unit 5 comprises a model monitoring mechanism 51 for monitoring changes in the models in the arithmetic unit 3; an information receiving mechanism 52 for receiving information regarding a plurality of facilities requested to utilize through the input/output equipment 2; a sequence and time allocation mechanism 53 for allocating a plurality of facilities an itinerancy or utilization sequence and time; and an output mechanism 54 for outputting the allocation information through the input/output equipment 2. The facilities utilization sequence and time allocation mechanism 53 allocates the sequence and time based on a facilities list sent from the facilities utilization request reception mechanism 52 and predicted information generated from the models in the arithmetic unit. In this case, initially, a time priority plan minimized of its itinerancy time is proposed from a time priority allocation mechanism 531. Starting from the initial plan proposed, an interactive modification processing mechanism 532 repeats interactive correction and addition of schedule information until a final plan is obtained while confirming cost and travel path (travel distance).

Figure 11A:
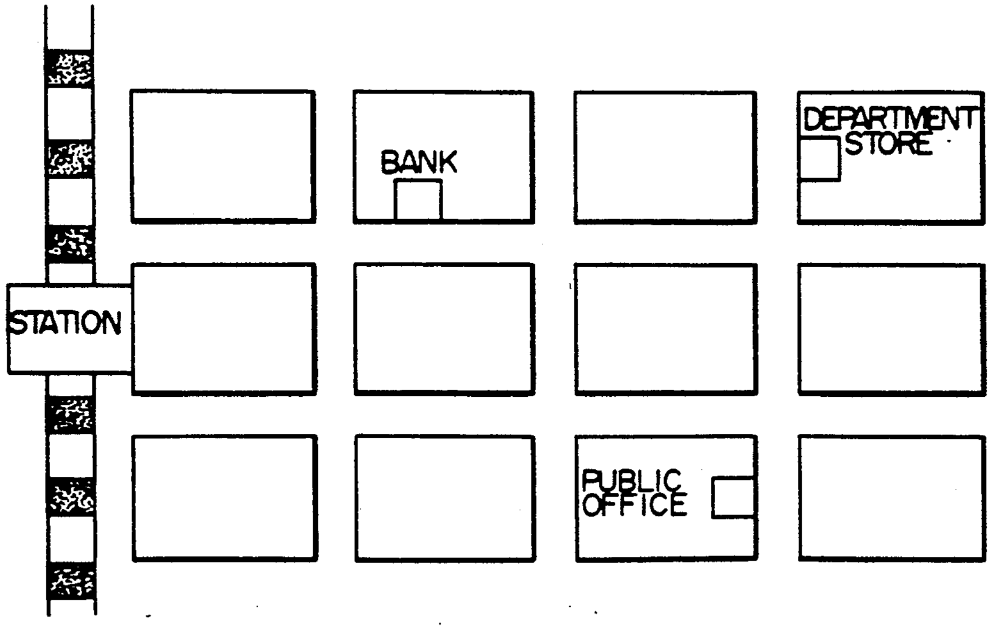
Figure 12:
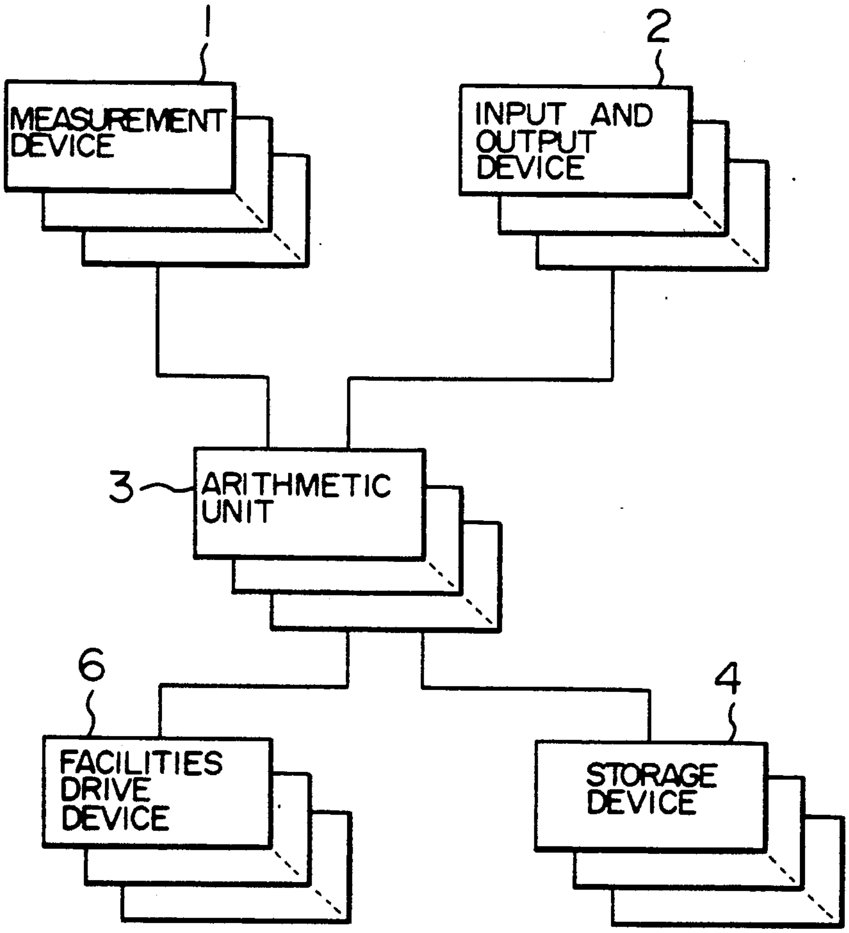
FIG. 12 is a schematic diagram as shown in FIG. 1 wherein facility drive equipment is added.
Figure 13:
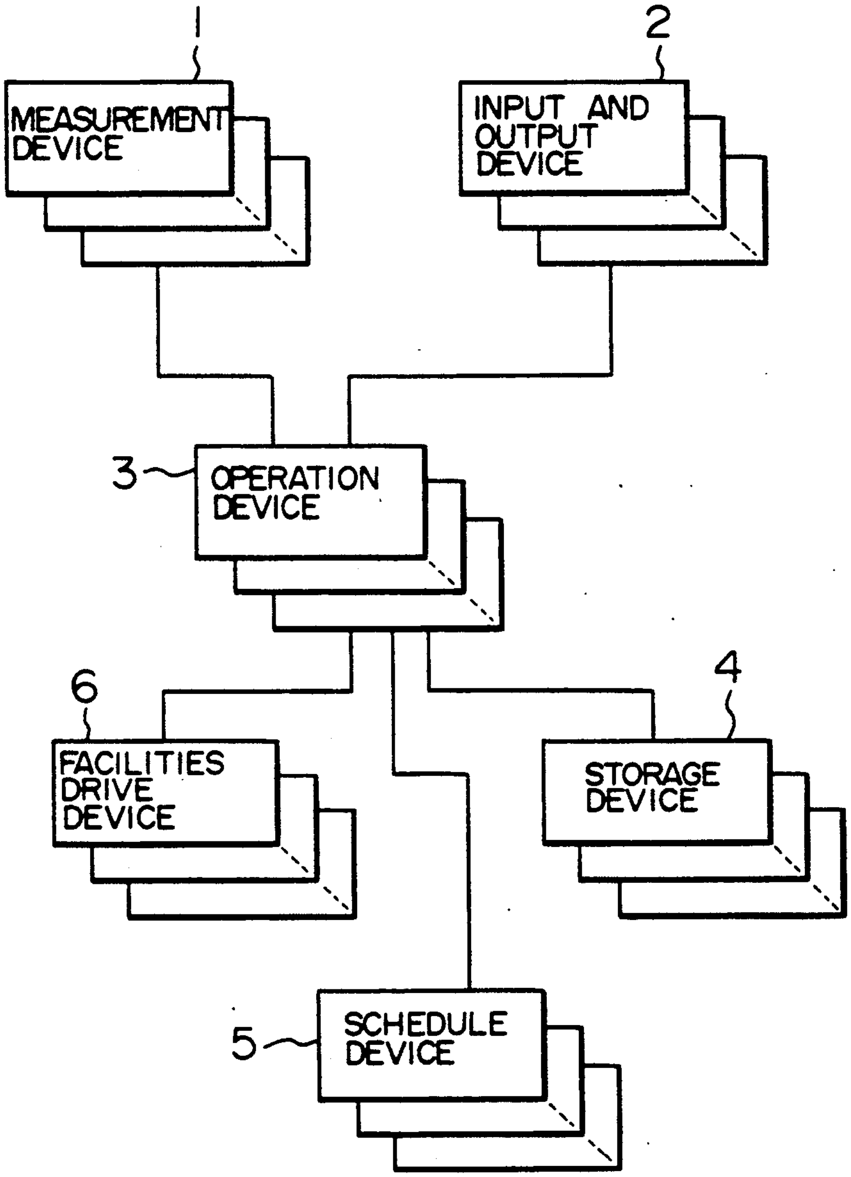
FIG. 13 is a schematic diagram as shown in FIG. 9 wherein the facility drive equipment is added.
Figure 14:
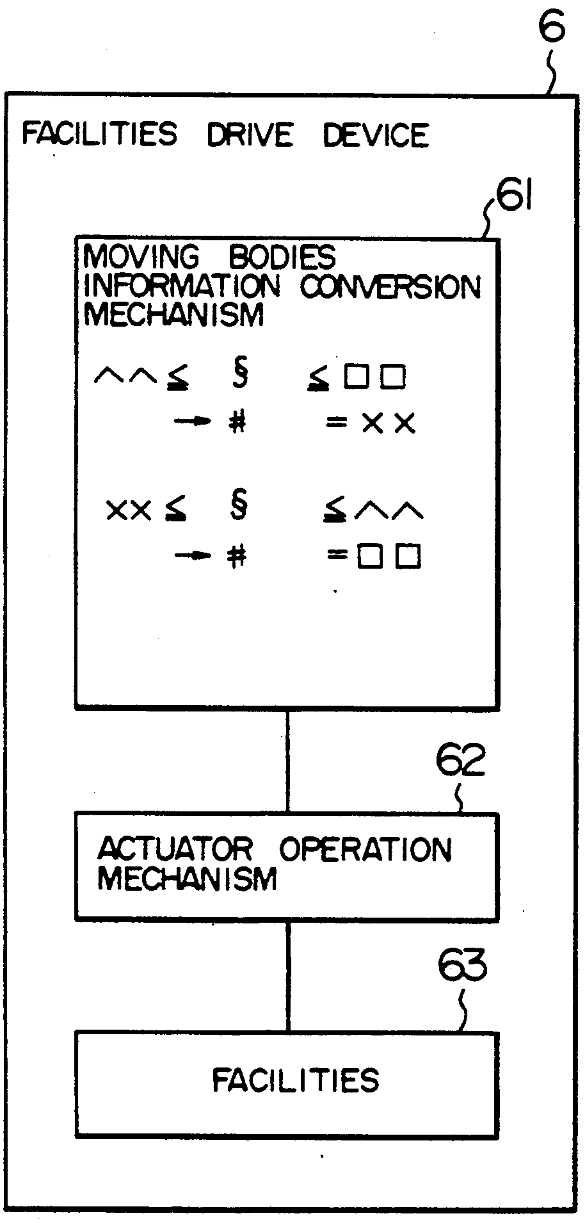
FIG. 14 shows an outline of processing in the facilities drive equipment.
Figure 15:
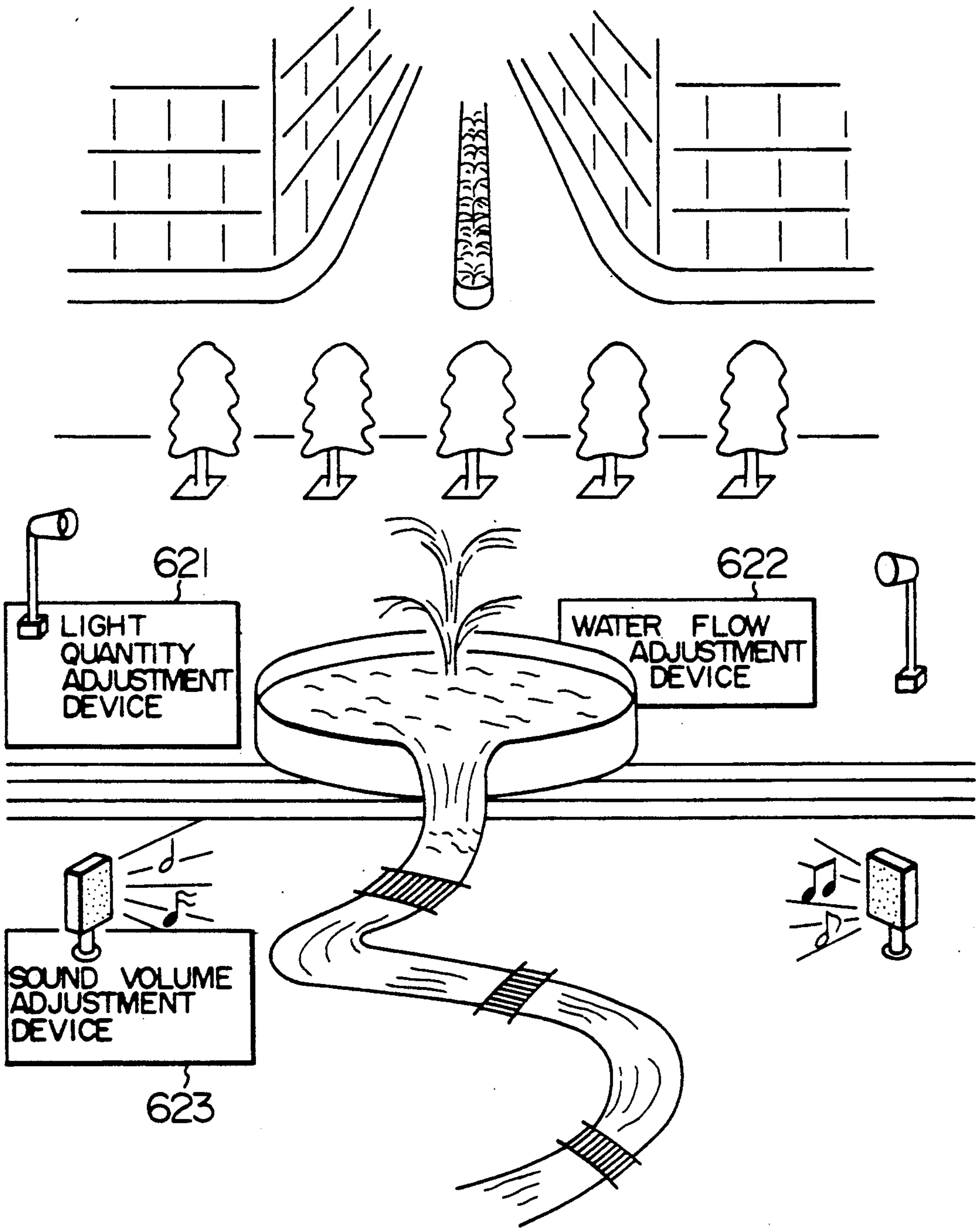
FIG. 15 explains how the present invention is applied to an environmental representation rendering system.
Figure 16A:
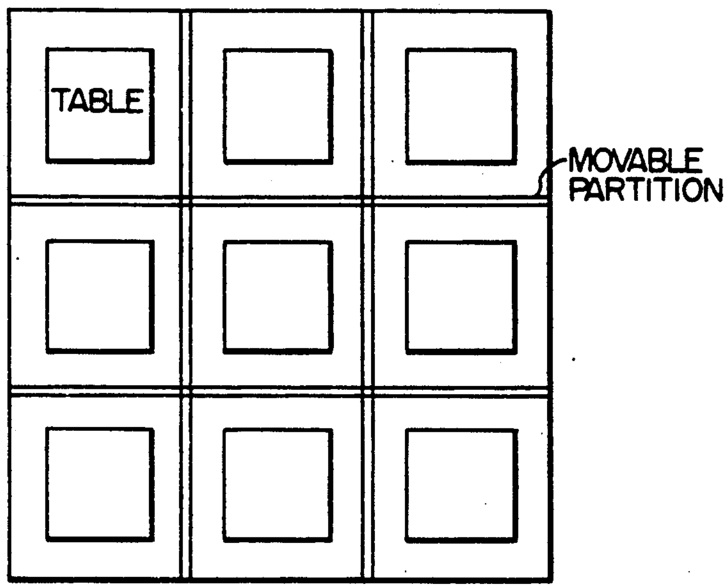
FIGS. 16A and 16B are diagrams illustrating an example of the facilities drive equipment of the present invention as applied to movable partitions whereby to provide different functions of a cafeteria and a conference room by separating a single half.
Figure 16B:
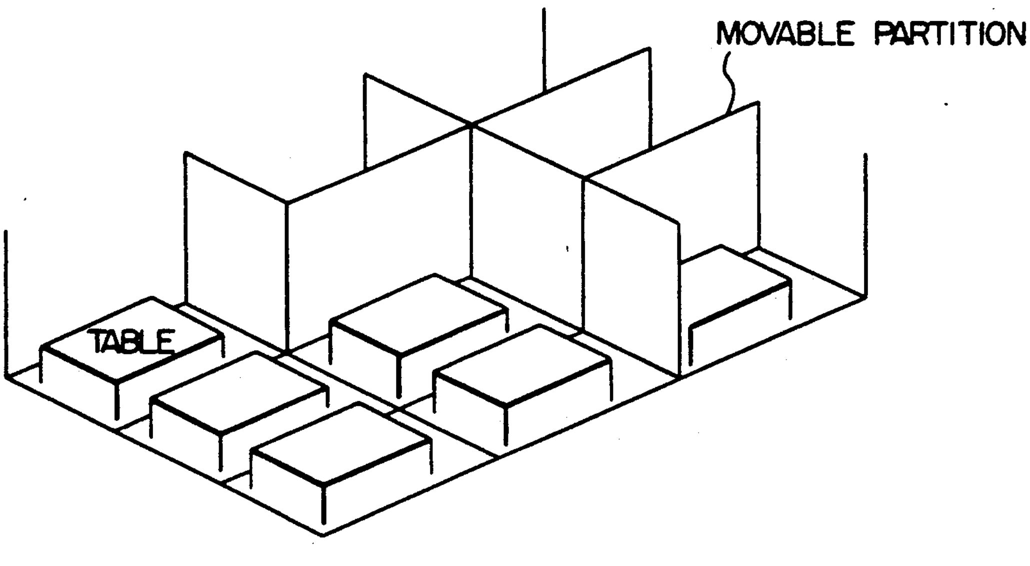

Another embodiment of the present invention as applied to scheduling equipment whereby the most efficient schedule for itinerating, for example, a railway station, a department store, a bank and a city office is capable of being generated, will be described below with reference to FIGS. 11A to 11F. FIG. 11A illustrates locations of the station, department store, bank and city office on the map. Through measurement equipment installed at each entrance of these facilities, the number of people entering and egressing is measured to provide information on the current utilization status of the facilities. However, because respective facilities are disposed apart from one another or from the current position of a moving body, it will take a time to get to either of them, or because respective service time zones available will differ by the facilities, such discrete information effective only at a certain instant will not be sufficient. Hence, through the prediction model generation according to the present invention based on the information supplied from the measurement equipment installed at respective facilities, it is possible to estimate a future utilization status of objective facilities, thereby enabling the arrangement to provide a more precise schedule. More specifically, time-variant prediction models for predicting the number of customers as shown in FIGS. 11B to 11D, taking into account both the past empirical information measured and current information such as the date of the week, weather and the like are generated. Using the above information and the travel time information which is obtained from the available service time information and the map information both stored in the memory such as FIG. 11E, the scheduling unit retrieves and displays the shortest travel time itineration sequence with constraint conditions of the open/close time imposed. Then, modification of this initial plan is repeated interactively until a final schedule as shown in FIG. 11F is determined. FIG. 12 illustrates a schematic block diagram as shown in FIG. 1 wherein a facilities drive unit 6 is added to an arithmetic unit 3. FIG. 13 illustrates a schematic block diagram as shown in FIG. 9 wherein a facilities drive unit 6 is connected to an arithmetic unit 3. The detail of the facilities drive unit 6 of FIG. 12 will be described below referring to FIG. 14. The facilities drive unit 6 receives information regarding moving bodies at a given time interval from the arithmetic unit 3. Within the facilities drive unit, a moving body information conversion mechanism 61 receives the information (on the number of moving bodies). Then, according to the information sent in, the conversion mechanism puts out actual operational variables and operational sequences for driving the facilities. The operational variables and sequences are determined therein through a conditional judgment or fuzzy logic judgment. An actuator operation mechanism 62 practically drives facilities 63 in accordance with the information which is output. In a place where moving bodies transit, as shown in FIG. 15, if artificial illumination, music, fountain (including artificial falls, rivers) facilities including such as a light quantity adjustment unit 621, water flow adjustment unit 622, sound volume controller unit 623 and the like, are specified as the drive unit to be included, they in combination take parts in an environmental representation rendering system whereby an environment containing the moving bodies is capable of being adjusted in accordance with the state of activity of the moving bodies. For example, if the moving bodies are people, the moving body information conversion mechanism executes procedures for rendering various environmental representations according to a specific situation: in case, there are many people moving fast, i.e., commuting time zone in the morning or evening, a tranquilizing background representation will be preferable; in case there are many people moving slowly, i.e., in an event hall or on playground, a showy and gaudy representation will be preferred; in case there are not many people but each moving fast, i.e., on holidays, cheerful representation will be preferred; and in case there not many people moving slowly, i.e., in the night, moody performance and representation will be preferred. In addition to the above, if new media tools such as image techniques, lasers and the like are added, the representation effect will be still more enhanced. Further, if movable walls or partitions are specified as the moving unit to be included, it becomes possible to provide for a plurality of service sectors and functions having different serving times of the day concurrently within a single facility, and change the capacity of service for a given service time zone and a given moving body from the information measured in advance on the people flow. For example, in an embodiment of the invention as applied to a cafeteria and a conference room, while the cafeteria has it peaks during lunch time and supper time, it is almost vacant other than these time zone. On the other hand, the conference room has a reciprocal manner of utilization. Elimination of dead space, and improved working ratio of facilities will be accomplished by implementing the above different services in a single facility. A complete switch over at once of service menu (between cafeteria and conference hall) by time zone will be too abrupt, resulting in a poor service quality (discarding a minor need). Thereby, in order to provide for a balanced service for different needs, it is necessary to estimate the needs from the people flow measured at the measuring equipment, and practically change their accommodation capacities by means of the moving walls or partitions in accordance with a given allocation ratio hereinabove obtained (FIG. 16A is a partitioned top plan view, and FIG. 16B is a perspective view of the same).

Figure 17A:
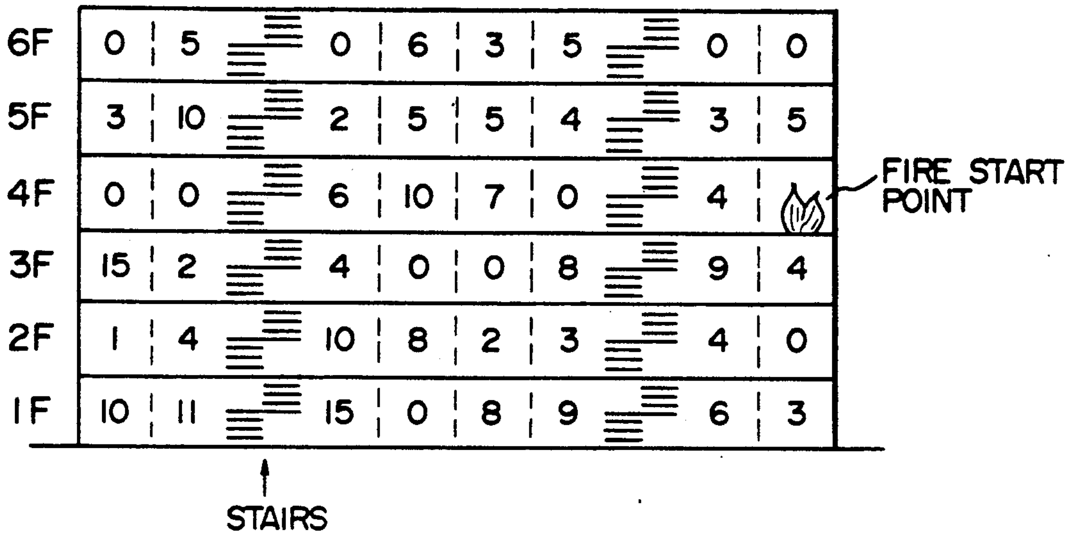
FIGS. 17A and 17B are explanatory diagrams illustrating how the present invention is applied to an evacuation guidance system.
Figure 17B:
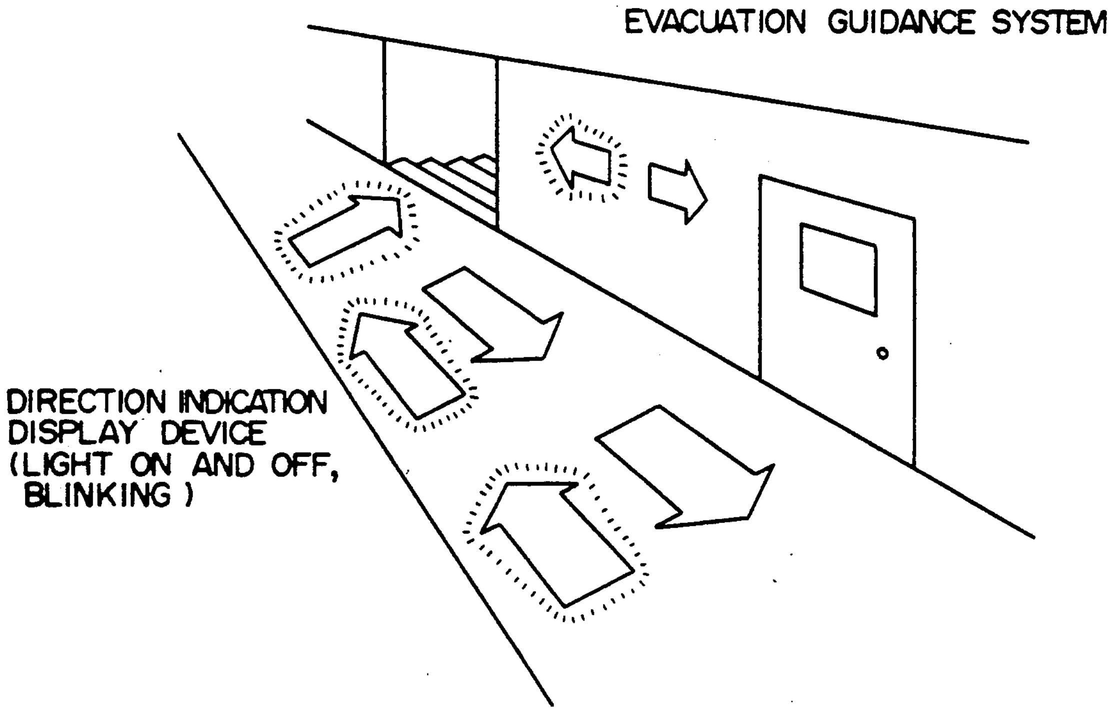

Another embodiment of the moving body and facilities control system as applied to an evacuation guidance system to be operated under the occurrence of an accident or emergency such as a fire or the like will be described below referring to FIGS. 17A and 17B. In an emergency, the building superintendent must indicate optimum evacuation routes and let the people evacuate out of the building safely. For this purpose, he/she must have information on a precise distribution of people inside the building, which is possible to be realized by installing the hereinbefore mentioned measuring equipment for measuring the flow of people at the entrance and in every floor (elevator entrance or staircase entrance in the building), and tenant entrances. Based on the information regarding the people flow measured and sent in, a control center displays such information on a map showing the location of an accident and a people distribution nearby, enabling to prepare an optimum evacuation plan. The evacuation plan to be displayed is prepared by taking into account of the actual people distribution, capacities of evacuation staircases and exits available, and anticipating the most efficient people flow that will not cause a local congestion. Then, an evacuation route as shown in FIG. 17B is indicated by means of a specific purpose indicator, a general purpose display using LED matrix or audio output equipment such as loudspeakers and the like.

Still another embodiment of the present invention is capable of being implemented as a disaster/accident detection/countermeasure system for preventing spread of a disaster in advance whereby enabling to notify possible disaster/accident information to related agencies and authorities, instructing to detour the point of accident by display means. The information of the disaster/accident is obtained by estimation through daily observation and measurement of the number, speed and direction of movement of people and vehicles in buildings and towns, with abrupt changes in the values of such measurements being judged as implying the occurrence of some accident/disaster.

Still a further embodiment of the aforementioned facilities drive unit as applied to airconditioning equipment in a building will be described in the following. Generally, it takes a time with any air conditioning equipment until a predetermined room temperature is reached in the summer or in the winter. Thereby, according to the prior art, customers or users who have arrived early have to wait in a building in uncomfortable conditions until the air conditioning is fully effected. This has been a major problem, in particular, in a skyscraper office building, department store and the like where a large number of people enter and egress always. Thereby, through application of the aforementioned moving body/facilities control system which will serve to predict the number of people who are likely to visit a particular building, operation of air conditioning equipment is capable of being dynamically controlled in advance corresponding to the predicted number of customers. More specifically, the number of arrivals at a spot where people disembark such as a railway station or bus stop is measured and the information is processed in the arithmetic unit to generate a pertinent model. Through such processing, it is possible to predict how many people will show up in what minutes later in a particular building, an objective of measurements. Upon reception of the information, the air conditioning equipment specified as the facilities drive equipment adjusts its air conditioning temperatures through predetermined operational variables.

Further an automatic door of still another embodiment of the present invention is capable of controlling intervals of opening and closing of the door such that while people are passing through with a small interval but in succession, the door is kept open, which will be effected through measurement not only in the vicinity of the door but also in a little wider area thereof. Through the means as above, it is possible to prevent such an accident that one may be caught between the door due to a delicate timing in following the preceding person. Further, with respect to the opening and closing of an elevator door, it is possible, for example, to slow down the closing timing of the door when there is detected a probable sick person or old person judged from the measurements of the speed and attributes of moving people.

With respect to a preferred position for installing the measuring equipment according to the present invention, they may be attached to poles or the like specially installed for the measurements, but in case to be installed to give an overhead view they may be attached on the top of an illumination post, or to the side of a tree, fire hydrant or anything else existing nearby in case to give a side view measurement. By installing the same in such a manner as above hidden from the moving bodies, not only aggravation of scenery can be prevented, but also unaffected measurements unnoticed by the moving bodies are possible.

According to the present invention, it is possible to reduce the time and cost which have been wasted in waiting or the like, so as to economically utilize the time, resources, or assets. Further, it provides valuable information necessary for city restructure planning or market surveys, instantly imparts information the user asks for, and provides for more safety, smoothly moving and comfortable city environments with waiting times and irritation minimized.

We claim:

1. A method of controlling a moving body and facilities comprising the steps of:

measuring and recognizing at least one parameter with respect to at least one moving body of a plurality of moving bodies such as a number of said moving bodies, and moving speed and moving direction of said at least one moving body; and changing a state of facilities to which said at least one moving body is heading for based on a result of said measuring and recognizing step, and displaying said state of said facilities.

2. A control method of controlling a moving body and facilities as claimed in claim 1, wherein said state of facilities to which said at least one moving body is heading for includes at least one of such information as a location, layout and services regarding said facilities.

3. A control method of controlling a moving body and facilities as claimed in claim 1, wherein said at least one moving body is at least one person.

4. A control method of controlling a moving body and facilities as claimed in claim 1, wherein said at least one moving body is a vehicle.

5. A control method of controlling a moving body and facilities as claimed in claim 1, further comprising a step of judging an abnormality in a movement of said at least one moving body through observing an incremental/decremental speed, tempo of traveling speeds, stoppage, directions of movement, and degrees of changes in respective parameters with respect to said plurality of moving bodies.

6. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

wherein said memory means includes a means for storing information measured by said measuring means, and said processing means includes a means for generating a prediction model for said at least one moving body and facilities from stored information.

7. The control apparatus for a moving body and facilities as claimed in claim 6, wherein said processing means includes a means for updating said prediction model.

8. A control apparatus for a moving body and facilities as claimed in claim 6, further comprising a driving means for driving a display of said facilities based on information of said prediction model.

9. A control apparatus for a moving body and facilities as claimed in claim 8, wherein said driving means includes a means capable of changing a size or moving body handling capacity of said facilities.

10. A control apparatus for a moving body and facilities as claimed in claim 8, wherein said driving means includes a means for adapting a display of said prediction model on a basis of environmental parameters such that parameters of an environment within which said at least one moving body is traveling is used to adjust a number and traveling speeds of moving bodies, measured by said measuring means.

11. A control apparatus for a moving body and facilities as claimed in claim 6, wherein said prediction model is to be generated by said processing means is classified and averaged information regarding said at least one moving body according to a date of the week/holidays when measurement was done, and includes consideration of influences of weather, temperature and humidity as influence coefficients.

12. A control apparatus for a moving body and facilities as claimed in claim 6, wherein said processing means includes;

a means for generating a descriptive model using predetermined parameters representing an interactive influence propagation relationship between respective associated information on a moving body obtained by a plurality of measuring means, and a means for calculating time delay in said interactive influence propagation according to status information stored in said memory means on a local area where said at least one moving body is heading for.

13. A control apparatus for a moving body and facilities as claimed in claim 12, wherein said processing means includes a means for updating parameters describing influence propagation relationships according to information from said plurality of measuring means.

14. A control apparatus for a moving body and facilities as claimed in claim 6, further comprising a scheduling means for providing a facilities utilization itineration schedule to said at least one moving body, with reference to a request list of facilities to be visited which was entered through said input/output means, and using prediction information availed by a model generated by said processing means with respect to facilities to be used by said at least one moving body, with weighting of evaluation criteria varied for time needed, cost and travel distance.

15. A control apparatus for a moving body and facilities as claimed in claim 1, further comprising a driving means for driving said facilities based on information of said prediction model.

16. A control apparatus for a moving body and facilities as claimed in claim 7, wherein said prediction model to be generated by said processing means is classified and averaged information regarding said at least one moving body according to a date of the week/holidays when measurement was done, and includes consideration of influences of weather, temperature and humidity as influence coefficients.

17. A control apparatus for a moving body and facilities as claimed in claim 7, further comprising a scheduling means for providing a facilities utilization itineration schedule to said at least one moving body, with reference to a request list of facilities to be visited which was entered through said input/output means, and using prediction information availed by a model generated by said processing means with respect to facilities to be used by said at least one moving body, with weighting of evaluation criteria varied for time needed, cost and travel distance.

18. A control apparatus for a moving body and facilities as claimed in claim 17, further comprising:

a scheduling means for scheduling and rescheduling based on information including said list and constraint conditions entered through said input/output means, and in the event of a void of scheduling because of said constraint conditions, a means for retrieving facilities providing similar services from said memory means, and rescheduling an alternate plan with similar facilities included.

19. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

wherein said memory means, disposed at an entrance and exit of said facilities, includes a means for estimating a utilization status of said facilities, calculating a waiting time from information measured at respective sites and information on capacity of services available at said facilities, and displaying a calculated said waiting time.

20. A control apparatus for a moving body and facilities as claimed in claim 19, further comprising a means for gathering information on a utilization status and waiting times for a plurality of facilities from measuring means, displaying gathered said utilization status and waiting times on a map showing locations of said facilities, on a display screen of said input/output means.

21. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

a display means for displaying information from one of said measuring means by specifying an object representing said measuring means with a pointing device, and related information regarding said measuring means from said processing means thereof.

22. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

wherein said measuring means includes a means for measuring reflected waves of energy radiation being emitted to said at least one moving body.

23. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

a plurality of devices as said measuring means and detectors for detecting changes in an environment, and a means for switching said plurality of devices for measurement.

24. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

wherein said input/output means includes a means for concurrently displaying both images measured by said measuring means and information calculated in said processing unit.

25. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

an abnormality judgment means for judging abnormality in a movement of said at least one moving body through observing an incremental/decremental speed, tempo of traveling speeds, stoppage, directions of movement, and degrees of changes in respective parameters with respect to said plurality of moving bodies.

26. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

said measuring means includes a means for measuring information transmitted from said at least one moving body;

wherein, in a case wherein said at least one moving body being people, information transmitted from said at least one moving body contains at least one of predetermined such information as sex, age, name, address, phone number, occupation, hobby with respect to said at least one moving body.

27. A control apparatus for a moving body and facilities comprising:

a measuring means for measuring at least one parameter with respect to at least one moving body of a plurality of moving bodies such as a number of moving bodies, moving speed, and moving direction of said at least one moving body;

a memory means for storing information on at least one of a condition of a local area in which said at least one moving body is moving and facilities said at least one moving body is heading for;

a processing means for processing information from said measuring means and memory means; and an input/output means for accessing information processed by said processing means, and displaying said information;

said measuring means includes a means for measuring information transmitted from said at least one moving body;

wherein, in a case where said at least one moving body being a vehicle, information transmitted from said at least one moving body contains at least one of predetermined information such as a plate number, type of vehicle, name of owner, address, attributes of payloads/passengers, destination with respect to said at least one moving body.

* * * * *